United States Patent [19]

McMaster et al.

[11] Patent Number: 5,273,568
[45] Date of Patent: * Dec. 28, 1993

[54] APPARATUS FOR PERFORMING HIGH EFFICIENT SYMMETRICAL QUENCHING OF ROLLER CONVEYED GLASS SHEETS

[75] Inventors: Ronald A. McMaster, Perrysburg, Ohio; Carl Kramer, Aachen, Fed. Rep. of Germany

[73] Assignee: Glasstech, Inc., Perrysburg, Ohio

[*] Notice: The portion of the term of this patent subsequent to Apr. 30, 2008 has been disclaimed.

[21] Appl. No.: 644,981

[22] Filed: Jan. 23, 1991

Related U.S. Application Data

[63] Continuation-in-part of Ser. No. 470,679, Jan. 26, 1990, abandoned.

[51] Int. Cl.$^5$ .................... C03B 27/044; C03B 35/18
[52] U.S. Cl. ........................................ 65/348; 65/351
[58] Field of Search .................... 65/348-351, 65/114

[56] References Cited

U.S. PATENT DOCUMENTS

| | | | |
|---|---|---|---|
| 4,515,622 | 5/1985 | McMaster et al. | 65/351 |
| 4,586,946 | 5/1986 | Kramer et al. | 65/273 |
| 4,767,439 | 8/1988 | Reunamaki | 65/351 |
| 5,011,525 | 4/1991 | McMaster | 65/351 |

FOREIGN PATENT DOCUMENTS

| | | |
|---|---|---|
| 2256087 | 6/1982 | Fed. Rep. of Germany . |
| 3150859 | 3/1983 | Fed. Rep. of Germany . |

OTHER PUBLICATIONS

Kramer et al., "Applications of Jet Flows in Industrial Flow Circuits", Journal of Wind Engineering and Industrial Aerodynamics, 16 (1984) 173-188.
Gattin Machines SA Brochure; The Technology of Safety Glass; 4 pages.
Kramer et al., Bending and Tempering of Three-Dimensionally-Shaped Glass Panels, 2 pages.
Dicks et al., New Bending and Tempering Facility for Automotive Safety Glazing, 3 pages.
Dicks et al., Bending and Tempering of Automotive and Similar Safety Glazings, 2 pages.

*Primary Examiner*—Joye L. Woodard
*Attorney, Agent, or Firm*—Brooks & Kushman

[57] ABSTRACT

A quench station (14) including apparatus for quenching a heated glass sheet G conveyed by rolls (22) of a roller conveyor (20) is disclosed as including upper and lower sets of blastheads (32) having outlets (34) that are positioned closer to the conveyed glass sheet than the conveyor roll radius R and which are oriented and sized to provide highly efficient quenching such as during heat strengthening or tempering. These blasthead outlets (34) are preferably round and the blastheads (32) are vertically aligned with each other to provide aligned locations (36) of impingement with the oppositely facing surfaces of the glass sheet. In one embodiment, a set of upper roll mimics (38) located above the conveyor rolls (22) in a vertically aligned relationship provide symmetry that results in uniform quenching of both the upper and lower glass sheet surfaces. In another embodiment, the upper set of blastheads (32') each have a greater dimension along the direction of conveyance than the lower set of blastheads (32') to balance the average gas pressures at the upper and lower glass sheet surfaces.

16 Claims, 3 Drawing Sheets

APPARATUS FOR PERFORMING HIGH EFFICIENT SYMMETRICAL QUENCHING OF ROLLER CONVEYED GLASS SHEETS

CROSS REFERENCE TO RELATED APPLICATION

This application is a continuation-in-part of prior application Ser. No. 470,679 filed on Jan. 26, 1990 in the names of Ronald A. McMaster and Carl Kramer.

TECHNICAL FIELD

This invention relates to an apparatus for providing high efficient symmetrical quenching of roller conveyed glass sheets.

BACKGROUND ART

Quenching of heated glass sheets on roller conveyors such as for tempering or heat strengthening is difficult to perform because the conveyor rolls that support the glass sheet for conveyance obstruct the lower glass surface. As such, there is limited area for permitting jets of quenching gas to impinge with the lower glass sheet surface and for the spent quenching gas to flow downwardly away from the glass sheet after impingement with the glass sheet. Furthermore, the presence of the conveyor rolls below the plane of conveyance provides a different quench configuration than above the plane of conveyance such that the lower and upper glass sheet surfaces are not quenched symmetrically to each other.

In order to accommodate for the conveyor roll obstruction problem at the lower glass sheet surface, it is conventional as disclosed in U.S. Pat. No. 4,515,622 McMaster et al to provide quenching gas outlets that are spaced from the glass sheet a distance at least as great as the conveying diameter of the conveyor rolls. Angling of quench tubes through which the quenching gas is supplied as disclosed by the McMaster et al patent permits a greater number of locations of impingement to be provided without blocking the area through which the spent quenching gas flows downwardly away from the conveyed glass sheet after its impingement with the adjacent glass sheet surface.

DISCLOSURE OF INVENTION

An object of the present invention is to provide improved apparatus for providing high efficient quenching of roller conveyed glass sheets such as for heat strengthening or tempering.

In carrying out the above object and other objects of the invention, apparatus for quenching a heated glass sheet is disclosed as including a roller conveyor having horizontally extending conveyor rolls that convey the heated glass sheet in an direction of conveyance along a plane of conveyance. These conveyor rolls are spaced from each other along the direction of conveyance and have centers about which the conveyor rolls rotate to provide the conveyance. Each conveyor roll includes an outer conveyor surface having a radius R. Upper and lower sets of blastheads of the apparatus are located above and below the plane of conveyance. Each blasthead has outlets through which quenching gas is supplied for flow along a path that impinges with the conveyed glass sheet. These outlets are each located closer to the conveyed glass than the conveyor roll radius R. Each outlet has a hydraulic diameter D and provides a gas flow path having a length L between the outlet and the impingement of the gas flow path thereof with the conveyed glass sheet The outlets each have a characteristic length of L/D less than 6. The outlets are spaced and oriented to provide a pattern of impingement locations spaced at the glass sheet in a center-to-center relationship with no two locations spaced closer to each other than the length L of the shortest gas flow path.

High efficient quenching of heated glass sheets is achieved by the relative close proximity of the quenching gas outlets to the glass sheet while maintaining the minimum spaced relationship specified so as to ensure adequate area for the spent quenching gas to escape after impingement with the conveyed glass sheet.

In the preferred construction of the apparatus, the outlets are generally round which provides the greatest efficiency in the quenching even through other shapes can be utilized to practice the invention. The preferred construction of the apparatus also has the upper and lower blastheads vertically aligned with each other and also has the outlets of the blastheads spaced and oriented to provide locations of impingement aligned with each other at the upper and lower surfaces of the conveyed glass sheet.

In one preferred embodiment, the apparatus also includes a set of upper roll mimics located above the conveyor rolls in a vertically aligned relationship. The upper and lower blastheads of this embodiment preferably have the same size and shape as each other so as to thereby cooperate with the conveyor rolls and roll mimics in providing symmetry above and below the plane of conveyance such that the upper and lower glass sheet surfaces are quenched symmetrically to each other. The roll mimics preferably have W-shaped cross sections. Also, the outlets of the both the upper and lower blastheads are oriented to provide the gas flow paths with different angles of incidence at the impingement thereof with the conveyance glass sheet.

Best results are achieved when the upper and lower sets of blastheads have the outlets thereof spaced and oriented to provide locations of impingement in an equilateral triangular pattern with the conveyed glass sheets. This equilateral triangular pattern permits the locations of impingements to be as close as possible to each other without obstructing the flow of the spent quenching gas away from the glass sheet after the impingement that provides the quenching.

In the preferred construction of the apparatus, each blasthead includes a formed sheet metal blasthead member that defines a quench gas plenum and the outlets through which the quenching gas is supplied from the plenum to the conveyed glass sheet as gas flow paths. Each outlet preferably includes a chamfered inlet through which the quenching gas enters the outlet for flow therethrough to the conveyed glass sheet. Each formed sheet metal blasthead member preferably has an elongated shape extending parallel to the conveyor rolls, and each lower blasthead has the sheet metal blasthead member thereof provided with a formed cross section of a curved shape at which the outlets are located and oriented to provide the gas flow paths with different angles of incidence at the impingement thereof with the conveyed glass sheet.

In another preferred embodiment, the lower blastheads are located between the conveyor rolls and have the outlets thereof oriented to provide the gas flow paths thereof with different angles of incidence at the impingement thereof with the conveyed glass sheet. The upper blastheads of this embodiment are located above the conveyor rolls in alignment with the lower blastheads and have a greater dimension along the direction of conveyance than the lower blastheads to balance the average gas pressures at the upper and lower surfaces of the conveyed glass sheet even though there are conveyor rolls at the lower glass sheet surface but no conveyor rolls at the upper glass sheet surface. Also, the outlets of the upper set of blastheads of this further embodiment direct the gas flow paths vertically in a parallel relationship to each other. These parallel gas flow paths supplied from above impinge with the glass sheet surface in an aligned relationship with the gas flow paths supplied at different angles of incidence from the lower blastheads.

The objects, features and advantages of the present invention are readily apparent from the following detailed description of the best modes for carrying out the invention when taking in connection with the accompanying drawings.

BEST MODES FOR CARRYING OUT THE INVENTION

Figure 1:
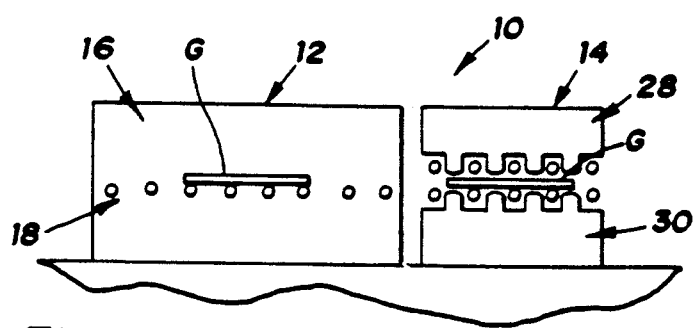
FIG. 1 is a side elevational view of one embodiment of a glass processing system for providing glass sheet quenching such as for tempering or heat strengthening.

With reference to FIG. 1 of the drawings, a glass sheet quench system 10 for providing heat strengthening or tempering includes a furnace 12 in which glass sheets G are heated for the quenching and also includes a quench station 14 that embodies apparatus of the present invention for providing quenching of the heated glass sheet as is hereinafter more fully described. Furnace 12 includes a heating chamber 16 in which a roller conveyor 18 is located for providing conveyance of the glass sheet G for the heating in any conventional manner. After heating to a sufficiently high temperature to permit heat strengthening or tempering, the glass sheet G is conveyed from the furnace 12 to the quench station 14 for the quenching. The glass sheet conveyance may be in a single direction from the left toward the right or may be in an oscillating fashion in the furnace 12 and/or the quench station 14.

Figure 2:
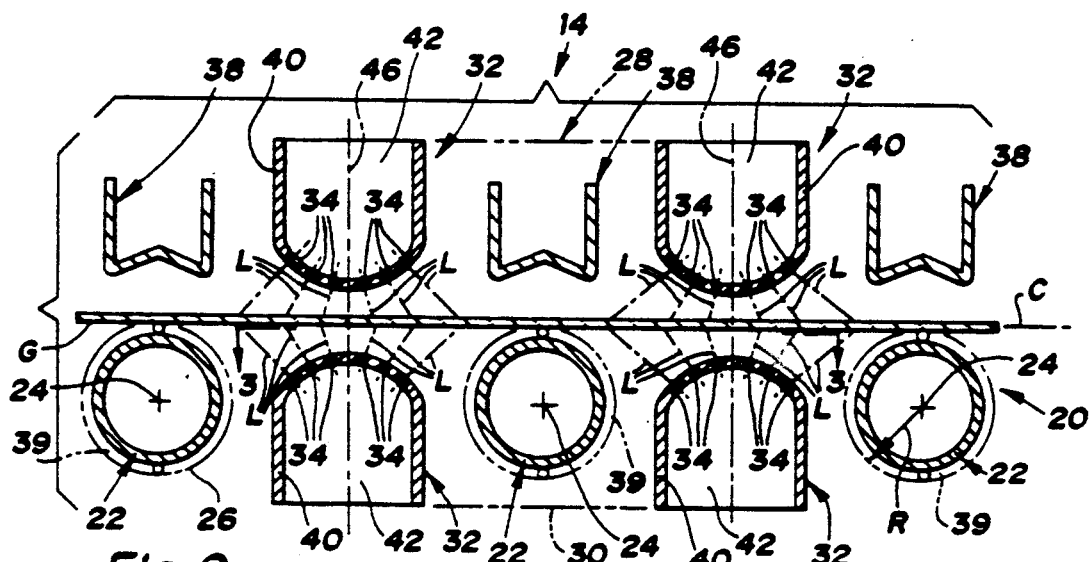
FIG. 2 is an enlarged elevational view taken in section through a quench station of the system in the same direction as viewed in FIG. 1.

With combined reference to FIGS. 1 and 2, the apparatus of the quench station 14 includes a roller conveyor 20 having horizontally extending conveyor rolls 22 that convey the heated glass sheet G in a direction of conveyance from the left toward the right along a horizontal plane of conveyance C. These conveyor rolls 22 are spaced from each other along the direction of conveyance and have centers 24 about which they rotate to provide the conveyance of the heated glass sheet during the quenching. Each conveyor roll 22 has an outer conveying surface 26 of a round shape with a radius R provided by a construction that is hereinafter more fully described.

With continuing reference to FIGS. 1 and 2, the apparatus of the quench station 14 also includes upper and lower quenches 28 and 30 which include sets of blastheads 32 respectively located above and below the plane of conveyance C. Each blasthead 32 has outlets 34 through which quenching gas is supplied for impingement with the conveyed glass sheet as is hereinafter more fully described. These outlets 34 are each located closer to the conveyed glass sheet G than the conveyor roll radius R.

Figure 7:
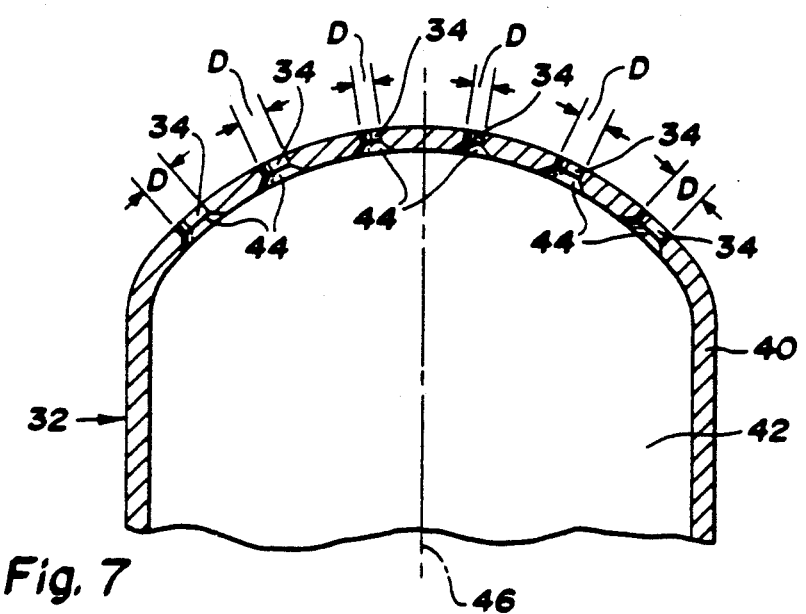
FIG. 7 illustrates the sheet metal member after forming thereof to the blasthead shape which preferably has an elongated construction whose cross section has a curved shape in which the outlets are located.

As shown in FIGS. 1 through 3 and FIG. 7, each blasthead outlet 34 has a hydraulic diameter D and provides a gas flow path having a length L between the outlet and the impingement of the gas flow path thereof with the conveyed glass sheet. More specifically, the hydraulic diameter D is equal to four times the area of the outlet divided by its circumference. Each outlet 34 has a characteristic length of L/D less than 6 which ensures that the gas jets provided are not too diffused before impingement with the glass sheet. Furthermore, the outlets 34 are spaced and oriented to provide impingement locations 36 which, as shown in FIG. 4, are spaced at the glass sheet G in a center-to-center relationship with no two locations spaced closer to each other than the length L of the shortest gas flow path. This limitation on the closeness of the spacing provides sufficient area for the spent quenching gas to flow away from the glass sheet after its impingement at the associated location 36. Also, the outlets 34 of both the upper and lower blastheads 32 are spaced in a pattern as best shown in FIGS. 2 and 7 to provide the gas flow paths thereof with different angles of incidence at the impingement thereof with the conveyed glass sheet G.

Figure 3:
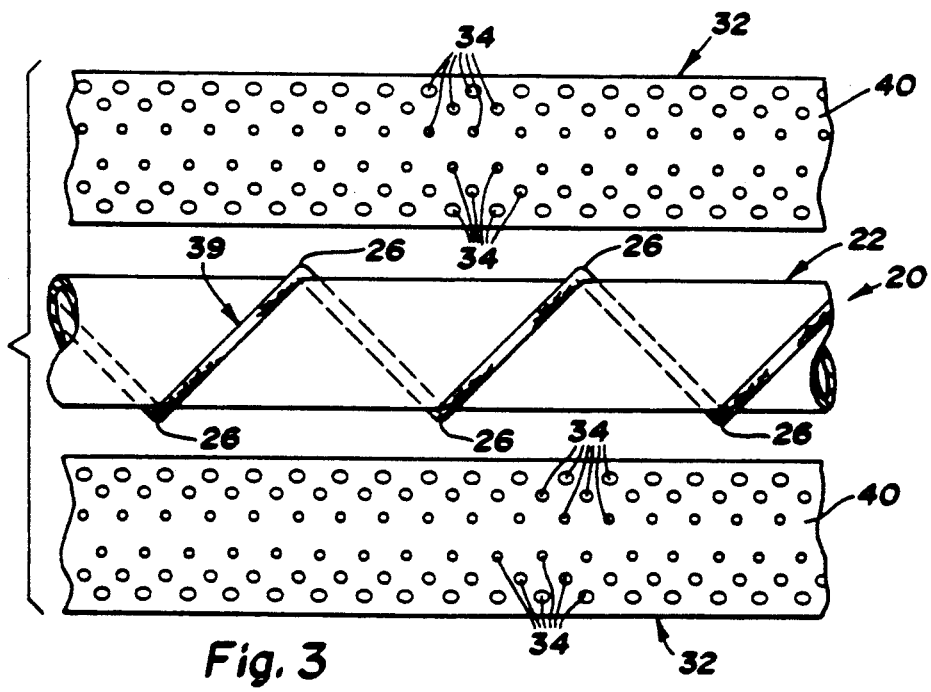
FIG. 3 is a plan view of the apparatus taken at the quench station along the direction of line 3—3 in FIG. 2.
Figure 4:
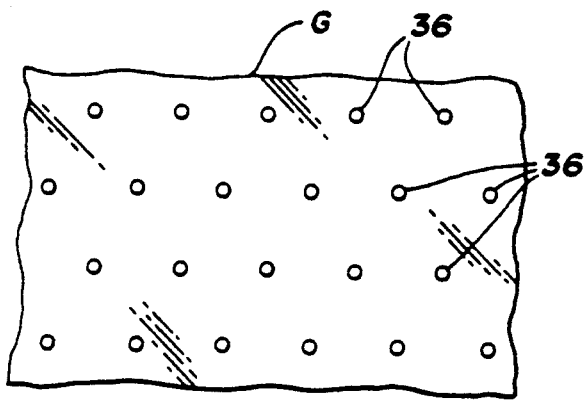
FIG. 4 is a view that illustrates the pattern of locations of impingement of gas flow paths with a conveyed glass sheet in a preferred equilateral triangular arrangement.

In the preferred construction as illustrated best in FIG. 3, the outlets 34 are generally round. This round shape of the outlets provides the greatest efficiency in quenching gas flow so as to thereby provide a more efficient quench station.

As illustrated best in FIG. 2, the upper and lower sets of blastheads 32 are vertically aligned with each other and have the outlets 34 thereof spaced and oriented to provide locations of impingement aligned with each other. In other words, each gas flow path impinges with one surface of the glass sheet G at the associated impingement location 36 and another gas flow path impinges with the opposite surface of the glass sheet at the same location so as to provide symmetry in the quenching between the glass sheet surfaces.

The embodiment of the apparatus shown in FIG. 2 also includes a set of upper roll mimics 38 located above the conveyor rolls 22 in a vertically aligned relationship. These roll mimics 38 have a size and shape that mimics the gas flow effect of the conveyor rolls 22 on which the glass sheet is conveyed. Each of the roll mimics 38 has a curved W-shaped cross section as illustrated, but other shapes could also be used so long as the gas flow at the upper glass surface is affected the same as the conveyor rolls affect the quenching gas flow at the lower surface of the glass sheet. The upper and lower blastheads 32 in this embodiment have the same size and shape as each other in order to provide symmetry in the configuration between the upper and lower surfaces of the glass sheet as far as affecting the quenching gas flow. However, it should be understood that the roll mimics 38 do have to be spaced upwardly slightly from the glass sheet G so as not to engage its upper surface and there is thus not exact symmetry between the upper and lower glass sheet surfaces as far as quenching gas flow is concerned even though such symmetry is substantially approached.

Each conveyor roll 22 has a minor diameter and also has its conveyor surface 26 provided by a helically wrapped support 39 provided by woven aromatic polyamide fibers such as sold under the trademark KEVLAR of E. I. DuPont Company of Wilimington, Del., United States of America. Such a support provides conveyance of the glass sheet without making its heat softened lower surface prior to cooling.

With reference to FIG. 4, the lower and upper sets of blastheads have the outlets thereof spaced and oriented to provide the impingement locations 36 in an equilateral triangular pattern with the conveyed glass sheet. This equilateral triangular pattern permits the impingement locations 36 to be positioned as close as possible to each other while still maintaining sufficient area for the spent quenching gas to escape after impingement with the glass sheet.

Figure 5:
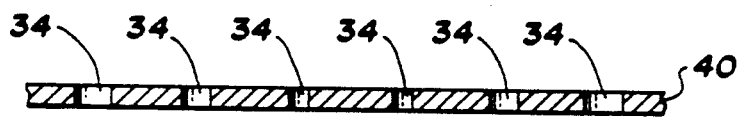
FIG. 5 is a sectional view illustrating a piece of sheet metal in which holes are provided to provide blasthead outlets.
Figure 6:
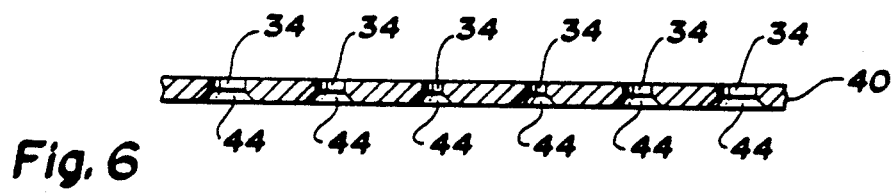
FIG. 6 is a sectional view illustrating chamfered inlets that are provided in the outlets of the sheet metal member to provide increased efficiency of the quenching gas flow through the outlets.

As best illustrated in FIG. 7, each blasthead 32 includes a formed sheet metal blasthead member 40 that defines a quench gas plenum 42 and the outlets 34. This formed sheet metal blasthead member 40 is manufactured from flat sheet metal, as shown in FIG. 5, through which the outlets 34 are initially stamped with a cylindrical shape. Thereafter, another stamping operation is performed to provide each outlet 34 with a chamfered inlet 44 which may either have sharp bevels as shown or smoothly curved bevels. The sheet metal blasthead member 40 is then formed from the flat condition of FIG. 6 to the configuration of FIG. 7 such that each outlet 34 has its chamfered inlet 44 through which the quenching gas enters the outlet for flow from the quench gas plenum through the outlet to the conveyed glass sheet. Efficiency is provided in the quenching by this chamfered construction of the inlet 4 of each outlet 34.

As illustrated in FIG. 3, each formed sheet metal blasthead member 40 has an elongated shape extending parallel to the conveyor rolls and, as shown in FIG. 7, has a formed cross section of a curved shape at which the outlets 34 are located.

As best illustrated by combined reference to FIGS. 2 and 3, each blasthead 32 has three different sizes of outlets 34 with the smallest outlets having the shortest gas flow path length L and an angle of incidence closest to a perpendicular relationship with the glass sheet plane of conveyance C. On each side of a centerline 46 (FIG. 2) of each blasthead 32 as illustrated in FIG. 2 and 3, the smallest size outlets 34 are located closest to the centerline laterally intermediate the next largest size outlets 34 which have a greater angle of incidence and in alignment with the largest size outlets 34 which have the greatest angle of incidence. Furthermore, the smallest size outlets 34 on each side of the centerline are located laterally intermediate the smallest size outlets 34 on the other side of the centerline 46.

Figure 8:
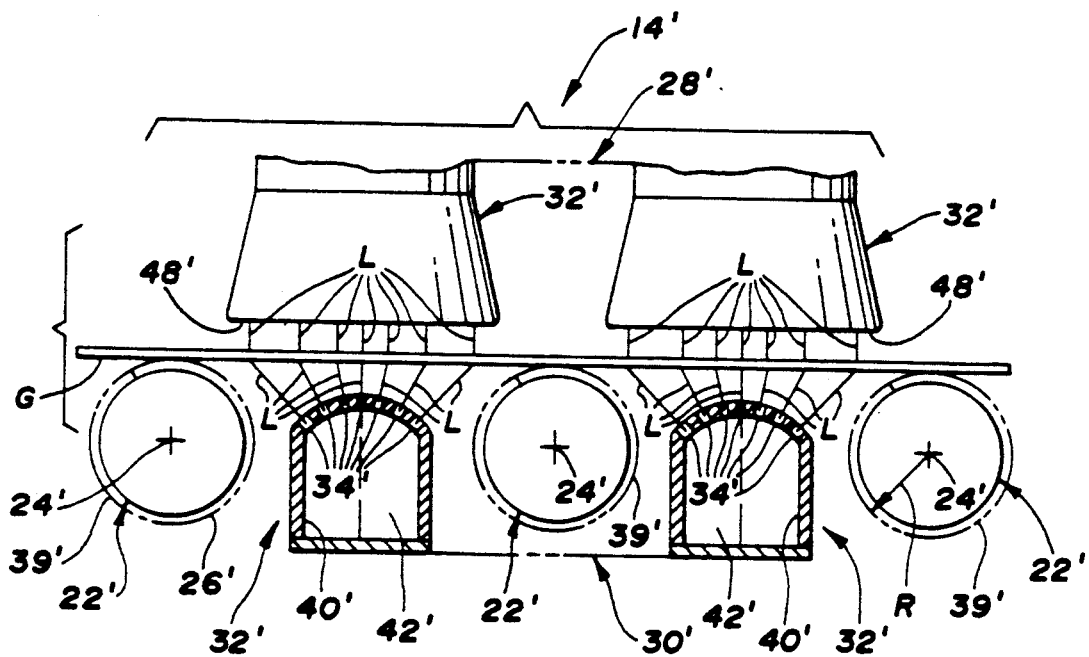
FIG. 8 is a sectional view similar to FIG. 2 of another embodiment of the quench station.
Figure 9:
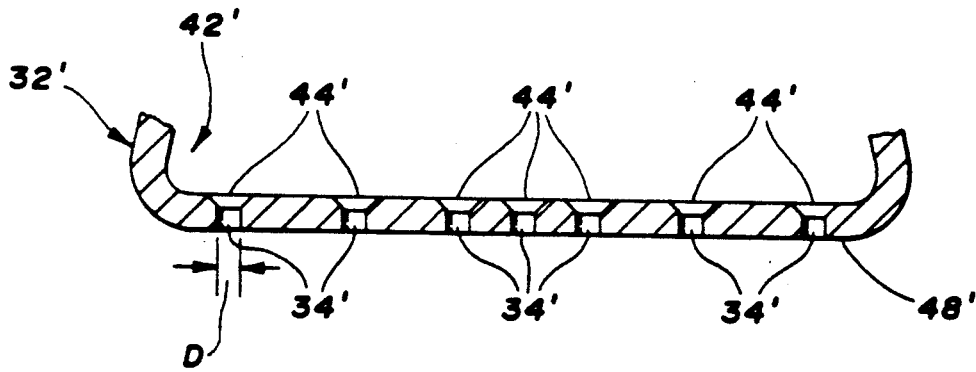
FIG. 9 is an enlarged sectional view illustrating one of the upper blastheads of the FIG. 8 embodiment.

With reference to FIGS. 8 and 9, another embodiment of the quench station has the same construction as the previously described embodiment except as will be noted and is thus identified with like primed reference numerals such that much of the prior description is applicable and need not be repeated. In this modified embodiment, the lower blastheads 32' are located between the conveyor rolls 22' like the previously described embodiment and have the outlets 34' thereof oriented to provide the gas flow paths with different angles of incidence at the impingement thereof with the conveyed glass sheet G. The upper blastheads 32' of this embodiment are also located above the conveyor rolls 22' as with the previous embodiment but have a greater dimension along the direction of conveyance than the lower blastheads 32' to balance the average gas pressures at the upper and lower surfaces of the conveyed glass sheet G even though there are conveyor rolls 22' at the lower glass sheet surface but no conveyor rolls at the upper glass sheet surface. More specifically, each of the upper blastheads 32' has a flat lower surface 48' that extends parallel to plane of conveyance and has the outlets 34' formed therethrough as illustrated in FIG. 9 preferably with the chamfers 44' such that the gas flow from the plenum 42' takes places efficiently as previously described. Thus, as shown in FIG. 9, each lower blasthead 32' has each of its outlets 34' provided with a hydraulic diameter D and a gas flow path having a length L between the outlet and the impingement of the gas flow path thereof with the conveyed glass sheet. More specifically, the hydraulic diameter D is equal to four times the area of the outlet divided by its circumference. Each upper blasthead outlet 34' has a characteristic length of L/D less than 6 which ensures that the gas jets provided are not too diffused before impingement with the glass sheet. Furthermore, the upper blasthead outlets 34' are spaced and oriented to provide impingement locations with no two locations spaced closer to each other than the length L of the shortest gas flow path. This limitation on the closeness of the spacing provides sufficient area for the spent quenching gas to flow upwardly away from the glass sheet after its impingement with the upper glass sheet surface.

The gas flow paths from the upper blasthead outlets 34' of the embodiment of FIGS. 9 and 10 impinge with the upper glass sheet surface in an aligned relationship with the gas flow paths from the lower blastheads and, as with the previous embodiment, the impingements are preferably in an equilateral triangular pattern as illustrated in FIG. 4. This equilateral triangular pattern as previously mentioned permits the impingement locations to be positioned as close as possible to each other while still maintaining sufficient area for the spent quenching gas to escape after impingement with the glass sheet. The escape area for spent quenching gas is reduced due to the close spacing between the upstream and downstream ends of each flat lower blasthead surface 48' with respect to the upper glass sheet surface. Furthermore, the outlets 34' of the upper set of blastheads 32' preferably direct the gas flow paths vertically in a parallel relationship to each other to provide the pattern of locations of impingement with the upper glass sheet surface. Also, each upper blasthead outlet 34' has the same diameter D as the others since the length L thereof is the same due to the parallel relationship of the upper blasthead surface 48' with the plane of conveyance.

While the best modes for practicing the invention has been described in detail, those familiar with the art to which this invention relates will recognize other embodiments and designs for practicing the invention as defined by the following claims.

what is claimed is:

1. Apparatus for quenching a heated glass sheet, comprising:
   a roller conveyor including horizontally extending conveyor rolls that convey the heated glass sheet in a direction of conveyance along a plane of conveyance, said conveyor rolls being spaced from each other along the direction of conveyance and having centers about which the conveyor rolls rotate to provide the conveyance, and each of the conveyor rolls including an outer conveying surface having a radius R;
   upper and lower sets of blastheads respectively located above and below the plane of conveyance, each of the sets of blastheads including a plurality of blastheads, each of the blastheads having outlets through which quenching gas is supplied for impingement with the conveyed glass sheet, said outlets each being located closer to the conveyed glass sheet than the conveyor roll radius R, each of the outlets having a hydraulic diameter D and providing a gas flow path having a length L to the conveyed glass sheet, each of the outlets having a characteristic length of L/D less than 6, and the outlets being spaced and oriented to provide a pattern of impingement locations spaced at the glass sheet in a center-to-center relationship with no two locations spaced closer to each other than the length L of the shortest gas flow path.

2. Apparatus as in claim 1 wherein the outlets are generally round.

3. Apparatus as in claim 2 wherein the upper and lower sets of blastheads have the outlets of the blastheads thereof spaced and oriented to provide locations of impingement aligned with each other.

4. Apparatus as in claim 1, 2 or 3 further including upper roll mimics located above the conveyor rolls in a vertically aligned relationship, and the blastheads of the upper and lower sets of blastheads having the same size and shape as each other.

5. Apparatus as in claim 4 wherein the roll mimics have W-shaped cross sections.

6. Apparatus as in claim 1, 2 or 3 wherein the blastheads of the upper and lower sets of blastheads have the outlets thereof spaced and oriented to provide the impingement locations with the conveyed glass sheet in an equilateral triangular pattern.

7. Apparatus as in claim 1, 2 or 3 wherein each of the blastheads includes a formed sheet metal blasthead member that defines a quench gas plenum and the outlets thereof.

8. Apparatus as in claim 7 wherein each of the outlets includes a chamfered inlet through which the quenching gas enters for flow therethrough to the conveyed glass sheet.

9. Apparatus as in claim 7 wherein each formed sheet metal blasthead member of the lower set of blastheads has an elongated shape extending parallel to the conveyor rolls, and each of the blastheads of the lower set of blastheads having the sheet metal blasthead member thereof provided with a formed cross section of a curved shape at which the outlets thereof are located and oriented to provide the gas flow paths thereof with different angles of incidence at the impingement thereof with the conveyed glass sheet.

10. Apparatus as in claim 1, 2 or 3 wherein the blastheads of the lower set of blastheads are located between the conveyor rolls and have the outlets of the blastheads thereof oriented to provide the gas flow paths thereof with different angles of incidence at the impingement thereof with the conveyed glass sheet, and the blastheads of the upper set of blastheads being located above the conveyor rolls in alignment with the blastheads of the lower set of blastheads and having a greater dimension along the direction of conveyance than the blastheads of the lower set of blastheads to balance the average gas pressures at the upper and lower surfaces of the conveyed glass sheet even through there are conveyor rolls at the lower glass sheet surface but no conveyor rolls at the upper glass sheet surface.

11. Apparatus as in claim 10 wherein the outlets of the blastheads of the upper set of blastheads direct the gas flow paths vertically in a parallel relationship to each other.

12. Apparatus for quenching a heated glass sheet, comprising:
   a roller conveyor including horizontally extending conveyor rolls that convey the heated glass sheet in a direction of conveyance along a plane of conveyance, said conveyor rolls being spaced from each other along the direction of conveyance and having centers about which the conveyor rolls rotate to provide the conveyance, and each of the conveyor rolls including an outer conveying surface having a radius R;
   upper and lower sets of blastheads respectively located above and below the plane of conveyance in vertical alignment with each other and having the same size and shape as each other, each of sets of blastheads including a plurality of blastheads, each of the blastheads having generally round outlets through which quenching gas is supplied for impingement with the conveyed glass sheet, said outlets each being located closer to the conveyed glass sheet than the conveyor roll radius R, each of the outlets having a diameter D and providing a gas flow path having a length L to the conveyed glass sheet, each of the outlets having a characteristic length of L/D less than 6, the outlets being spaced in a pattern and oriented to provide the gas flow paths thereof with different angles of incidence at the impingement thereof with the conveyed glass sheet, and the outlets being spaced and oriented to provide impingement locations spaced at the glass sheet in a center-to-center relationship with no two locations spaced closer to each other than the length L of the shortest gas flow path and with the locations associated with the upper set of blastheads aligned with the locations associated with the lower set of blastheads; and
   a set of upper roll mimics located above the conveyor rolls in a vertically aligned relationship.

13. Apparatus for quenching a heated glass sheet, comprising:
   a roller conveyor including horizontally extending conveyor rolls that convey the heated glass sheet in a direction of conveyance along a plane of conveyance, said conveyor rolls being spaced from each other along the direction of conveyance and having centers about which the conveyor rolls rotate to provide the conveyance, and each of the conveyor rolls including an outer conveying surface having a radius R; and upper and lower sets of blastheads located above and below the plane of conveyance in vertical alignment with each other and having the same size and shape as each other, each of the sets of blastheads including a plurality of blastheads, each of the blastheads including a formed sheet metal blasthead member defining a quench gas plenum and having generally round outlets through which quenching gas is supplied for flow from the plenum and impingement with the conveyed glass sheet, said outlets each being located closer to the conveyed glass sheet than the conveyor roll radius R, each of the outlets having a chamfered inlet through which the quenching gas enters the outlet from the quench plenum for flow therethrough to the conveyed glass sheet, each of the outlets having a diameter D and providing a gas flow path having a length L to the conveyed glass sheet, each of the outlets having a characteristic length of L/D less than 6, the outlets being spaced in a pattern and oriented to provide the gas flow paths thereof with different angles of incidence at the impingement thereof with the conveyed glass sheet, and the outlets being spaced and oriented to provide impingement locations spaced at the glass sheet in a center-to-center relationship with no two locations spaced closer to each other than the length L of the shortest gas flow path and with the locations associated with the upper set of blastheads aligned with the locations associated with the lower set of blastheads; and roll mimics located above the conveyor rolls in a vertically aligned relationship.

14. Apparatus as in claim 13 wherein the roll mimics have W-shaped cross sections.

15. Apparatus for quenching a heated glass sheet, comprising:

a roller conveyor including horizontally extending conveyor rolls that convey the heated glass sheet in a direction of conveyance along a plane of conveyance, said conveyor rolls being spaced from each other along the direction of conveyance and having centers about which the conveyor rolls rotate to provide the conveyance, and each of the conveyor rolls including an outer conveying surface having a radius R; and upper and lower sets of blastheads located above and below the plane of conveyance, each of the sets of blastheads including a plurality of blastheads, each of the blastheads having outlets through which quenching gas is supplied for impingement with the conveyed glass sheet, said outlets each being located closer to the conveyed glass sheet than the conveyor roll radius R, each of the outlets having a hydraulic diameter D and providing a gas flow path having a length L to the conveyed glass sheet, each of the outlets having a characteristic length of L/D less than 6, the blastheads of the lower set of blastheads being located between the conveyor rolls and having the outlets thereof oriented to provide the gas flow paths thereof with different angles of incidence at the impingement thereof with the conveyed glass sheet, the blastheads of the upper set of blastheads being located in alignment with the blastheads of the lower set of blastheads and having the outlets thereof oriented to provide vertical gas flow paths parallel to each other, the blastheads of the upper set of blastheads also having a greater dimension along the direction of conveyance than the blastheads of the lower set of blastheads to balance the average gas pressures at the upper and lower surfaces of the conveyed glass sheet even though there are conveyor rolls at the lower glass sheet surface but no conveyor rolls at the upper glass sheet surface and both the upper and lower sets of blastheads having the outlets of the blastheads thereof spaced and oriented to provide impingement locations spaced at the glass sheet in a center-to-center relationship with no two locations spaced closer to each other than the length L of the shortest gas flow path.

16. Apparatus for quenching a heated glass sheet, comprising:

a roller conveyor including horizontally extending conveyor rolls that convey the heated glass sheet in a direction of conveyance along a plane of conveyance, said conveyor rolls being spaced from each other along the direction of conveyance and having centers about which the conveyor rolls rotate to provide the conveyance, and each of the conveyor rolls including an outer conveying surface having a radius R; and upper and lower sets of blastheads located above and below the plane of conveyance, each of the sets of blastheads including a plurality of blastheads, each of the blastheads including a formed sheet metal blasthead member that defines a quench gas plenum and has outlets through which quenching gas is supplied for impingement with the conveyed glass sheet, said outlets each being located closer to the conveyed glass sheet than the conveyor roll radius R, each of the outlets having a chamfered inlet through which the quenching gas enters for flow therethrough to the conveyed glass sheet, each of the outlets having a hydraulic diameter D and providing a gas flow path having a length L to the conveyed glass sheet, each of the outlets having a characteristic length of L/D less than 6, the blastheads of the lower set of blastheads being located between the conveyor rolls and having the outlets thereof oriented to provide the gas flow paths thereof with different angles of incidence at the impingement thereof with the conveyed glass sheet, the blastheads of the upper set of blastheads being located in alignment with the blastheads of the lower set of blastheads and having the outlets thereof oriented to provide vertical gas flow paths parallel to each other, the blastheads of the upper set of blastheads also having a greater dimension along the direction of conveyance than the blastheads of the lower set of blastheads to balance the average gas pressures at the upper and lower surfaces of the conveyed glass sheet even through there are conveyor rolls at the lower glass sheet surface but no conveyor rolls at the upper glass sheet surface, and the blastheads of both the upper and lower sets of blastheads having the outlets thereof spaced and oriented to provide impingement locations spaced at the glass sheet in a center-to-center relationship with no two locations spaced closer to each other than the length L of the shortest gas flow path.

* * * * *

UNITED STATES PATENT AND TRADEMARK OFFICE
CERTIFICATE OF CORRECTION

PATENT NO. : 5,273,568
DATED : December 28, 19993
INVENTOR(S) : Ronald A. McMaster, et al It is certified that error appears in the above-indentified patent and that said Letters Patent is hereby corrected as shown below:

Column 1, line 54, before "direction" change "an" to --a--;

Column 2, line 15, after "even" change "through" to --though--;

Column 2, line 33, after "outlets of" delete "the";

Column 5, line 51, after "inlet" change "4" to --44--;

Column 6, line 26, after "parallel to" insert --the--;

Column 10, line 15, Claim 15, after "no" change "tow" to --two--;

Column 10, line 59, Claim 16, after "even" change "through" to --though--.

Signed and Sealed this

Fourteenth Day of June, 1994

Attest:

BRUCE LEHMAN

*Attesting Officer*     *Commissioner of Patents and Trademarks*